US008464237B1

(12) United States Patent
Taylor (10) Patent No.: US 8,464,237 B1
(45) Date of Patent: Jun. 11, 2013

(54) METHOD AND APPARATUS FOR OPTIMIZING COMPILATION OF A COMPUTER PROGRAM

(75) Inventor: Ian Lance Taylor, Berkeley, CA (US)

(73) Assignee: Google Inc., Mountain View, CA (US)

( * ) Notice: Subject to any disclaimer, the term of this patent is extended or adjusted under 35 U.S.C. 154(b) by 1274 days.

(21) Appl. No.: 12/038,491

(22) Filed: Feb. 27, 2008

(51) Int. Cl.
*G06F 9/44* (2006.01)
*G06F 9/45* (2006.01)

(52) U.S. Cl.
USPC .......................................... 717/165; 717/159

(58) Field of Classification Search
USPC .......................................... 717/159, 165–66
See application file for complete search history.

(56) References Cited

U.S. PATENT DOCUMENTS

| | | | |
|---|---|---|---|
| 5,778,212 A * | 7/1998 | Dehnert et al. ............... | 717/155 |
| 5,790,861 A * | 8/1998 | Rose et al. .................... | 717/145 |
| 5,973,687 A * | 10/1999 | Foley et al. ................... | 717/110 |
| 7,047,530 B2 * | 5/2006 | Lu ................................. | 717/160 |
| 7,346,903 B2 * | 3/2008 | Ball et al. ...................... | 717/162 |
| 7,676,789 B2 * | 3/2010 | Omiya et al. .................. | 717/162 |
| 2003/0200536 A1 * | 10/2003 | Stuefe ........................... | 717/162 |
| 2006/0031821 A1 * | 2/2006 | Rutter ........................... | 717/140 |

* cited by examiner

*Primary Examiner* — Li B Zhen
*Assistant Examiner* — Ryan Coyer
(74) *Attorney, Agent, or Firm* — Honigman Miller Schwartz and Cohn LLP (57) ABSTRACT

One embodiment of the present invention provides a system for compiling a computer program. During operation, the system receives one or more source code files associated with a computer program at a compiler. Next, the system starts a linker which links object files into an executable program. The system then compiles the one or more source code files into one or more object files. Upon creating each object file, the system sends the object file to the linker without waiting to create the remaining object files.

18 Claims, 5 Drawing Sheets

METHOD AND APPARATUS FOR OPTIMIZING COMPILATION OF A COMPUTER PROGRAM

BACKGROUND

1. Field of the Invention

The present invention relates to the process of compiling a computer program. More specifically, the present invention relates to a method and apparatus for optimizing the compilation of a computer program.

2. Related Art

Historically, computer programs have included only a small number of source code files of limited size, which enabled compilers to compile computer programs relatively quickly. This compilation process typically involves compiling a computer program's source code into a set of object files. Next, a linker completes the compilation process by linking these object files together with library files to create an executable file that an end user can execute.

Today, the compilation process has not changed significantly. However, the number and size of source code files associated with larger applications has increased substantially, which has increased the time it takes to compile such applications.

One way to increase the speed of compilation is to use a parallel-processing system, which uses multiple processors to compile the source code into object files. Once the parallel processors have finished creating the object files, the parallel processors send the object files to the linker, which completes the compilation process. Although parallel processing can reduce the time required to create the object files, the linking process cannot easily be improved by parallel processing and remains a time-intensive bottleneck.

Hence, what is needed is a method and apparatus for optimizing compilation of a computer program without the above-described problems.

SUMMARY

One embodiment of the present invention provides a system for compiling a computer program. During operation, the system receives one or more source code files associated with a computer program at a compiler. Next, the system starts a linker which links object files into an executable program. The system then compiles the one or more source code files into one or more object files. Upon creating each object file, the system sends the object file to the linker without waiting to create the remaining object files.

In a variation on this embodiment, each object file is comprised of multiple sections, wherein each section is associated with a different type of object file information.

In a further variation, the linker organizes into contiguous memory each section of the object file that is associated with the same type of object file information.

In a variation on this embodiment, the system receives the one or more source code files at multiple compilers, which are located at different clients, wherein each compiler sends the resulting object files to the linker.

In a variation on this embodiment, sending an object file to the linker involves sending a notification message to the linker which enables the linker to retrieve the object file from the compiler.

In a variation on this embodiment, starting the linker involves providing the linker with a handle to each object file, which enables the linker to use a notification-system-call to detect modifications to each object file.

In a further variation, when the system detects a modification to the object file, the linker retrieves the object file from the associated compiler.

In a variation on this embodiment, the linker associates a different thread with each object file.

In a variation on this embodiment, the system starts the linker on a node in a distributed computing system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a compilation manager that optimizes the process of compiling a computer program. The compilation manager can comprise any system which manages a cluster of compilers which can communicate with a linker over a network.

In one embodiment of the present invention, the compilation manager receives one or more source code files from a user. The compilation manager then distributes the one or more source code files to one or more compilers in the cluster of compilers which can create object files from the source code files. Note that the compilation manager can determine the number of source code files and which source code files to distribute to each compiler based on: a default setting; the number of source code files the compilation manager received; the size of each source code file; the type of each source code file; and any other information which the compilation manager can use to facilitate determining the number of source code files and which source code files to distribute to each compiler.

In one embodiment of the present invention, upon completion of the compilation of a source code file, the compilation manager sends the resulting object file to the linker. Note that the compilation manager sends the object file to the linker without waiting for the compiler, or the other parallel compilers to complete the compilation of the remaining source code files.

In one embodiment of the present invention, when a compiler finishes compiling a source code file to create an object file, the compilation manager notifies the linker that the compiler has created the object file. The linker can then retrieve the object file from the compiler.

In one embodiment of the present invention, the compiler sends the object file to a database. In this embodiment, the linker can retrieve the object file from the database.

In one embodiment of the present invention, the linker organizes each section associated with the same type of object file information into contiguous memory without waiting to receive the remaining object files. For example, the .rodata section from one object file can be stored contiguously with the .rodata sections from each of the remaining object files. In a second example, the .bss section from one object file can be stored contiguously with the .bss sections from each of the remaining object files. The linker can then complete the linking process to create an executable program.

In one embodiment of the present invention, the linker can store the .bss sections in memory which is not contiguous with the .rodata sections. For example, the linker can store the .bss sections with a one-megabyte gap between the .bss sections and the .rodata sections. This embodiment enables the linker to begin the linking process prior to receiving all of the object files from the compilers without creating a memory allocation problem. For example, a memory allocation problem can arise when the linker runs out of unallocated contiguous memory to store .bss information because the linker stored .rodata information directly after the .bss information.

In one embodiment of the present invention, the linker can process each object file via a separate thread. This embodiment enables the linker to process multiple object files in parallel. The linker can then retrieve the results of processing each object file from the separate threads to finish the linking process and create the executable program.

Computing Environment

Figure 1:
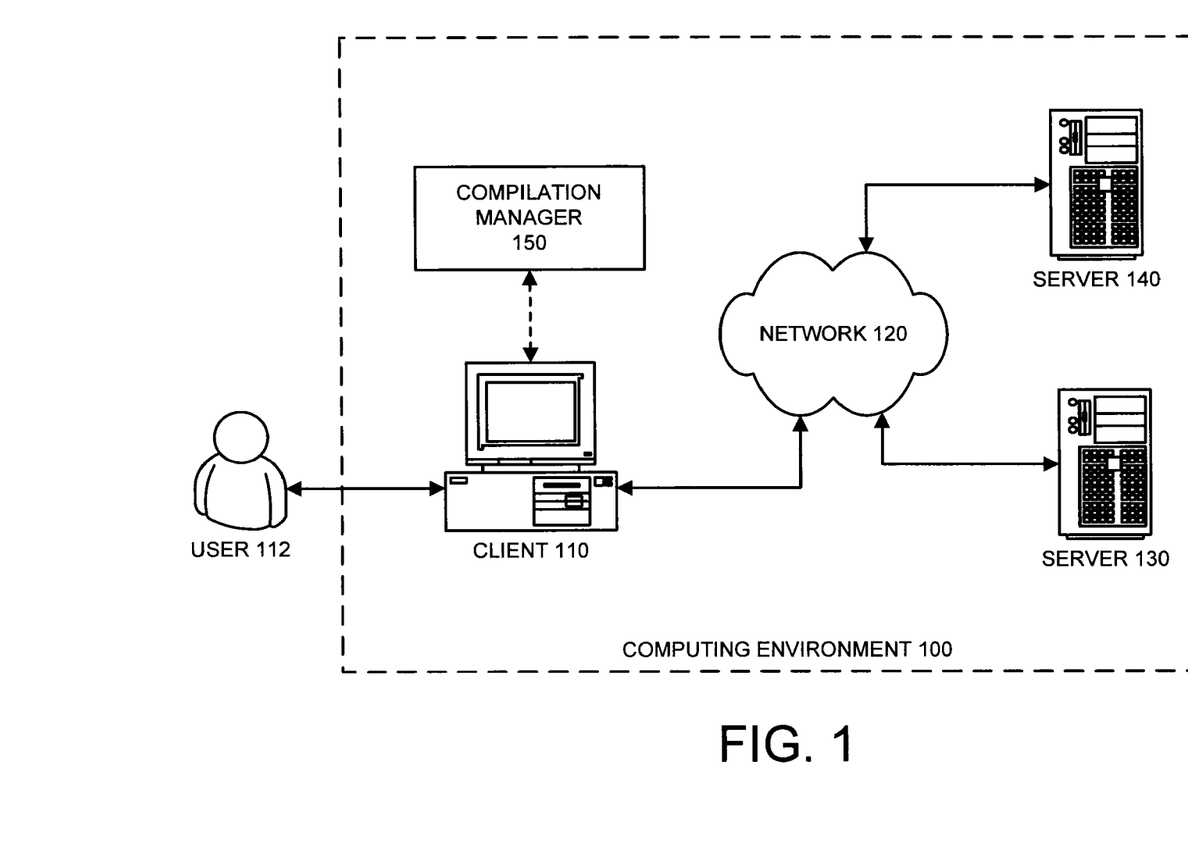
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client 110, network 120, server 130, server 140, and compilation manager 150.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 comprises the Internet.

Servers 130 and 140 can generally include any nodes on a computer network including a mechanism for servicing requests from a client for computational and/or data storage resources.

Compilation manager 150 can generally include any system for compiling source code into an executable program. In one embodiment of the present invention, client 110 hosts compilation manager 150.

In one embodiment of the present invention, server 130 and server 140 can host compilation manager 150.

In one embodiment of the present invention, compilation manager 150 can be a stand-alone system.

In one embodiment of the present invention, compilation manager 150 can be a distributed system.

User 112 can generally include: an individual; a group of individuals; an organization; a group of organizations; a computing system; a group of computing systems; or any other entity that can interact with computing environment 100.

In one embodiment of the present invention, user 112 can be a client.

Compilation Manager

Figure 2:
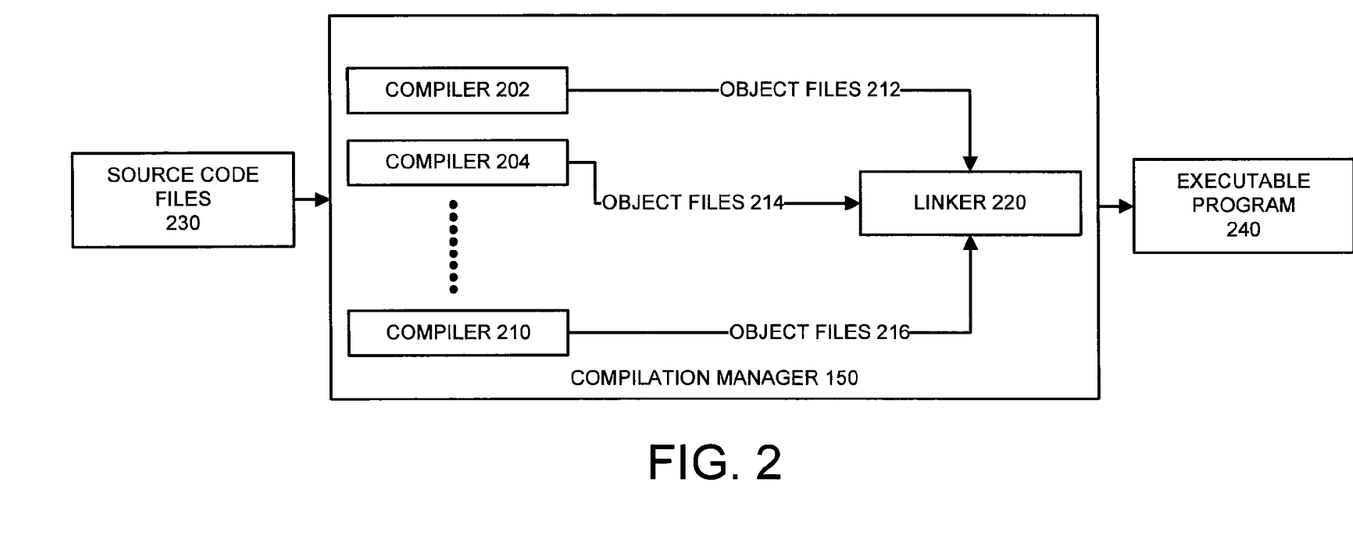
FIG. 2 illustrates a compilation manager in accordance with an embodiment of the present invention.

FIG. 2 illustrates a compilation manager 150 in accordance with an embodiment of the present invention. Compilation manager 150 can include any number of compilers, such as compilers 202, 204, and 210. Compilation manager 150 can also include linker 220.

Compilers 202, 204, and 210 can generally include any type of compiler for converting source code files into object files. For example, compilers 202, 204, and 210 can be C++ compilers.

In one embodiment of the present invention, different computing devices can host compilers 202, 204, and 210. For example, client 110 can host compiler 202, server 130 can host compiler 204, and server 140 can host compiler 210.

Linker 220 can generally include any type of linker for combining a set of object files into an executable program. In one embodiment of the present invention, the set of object files can include a set of library files.

In one embodiment of the present invention, compilation manager 150 receives source code files 230 from user 112, client 110, or any other computing system that can send source code files to a compilation manager. Compilation manager 150 can then distribute subsets of source code files 230 to compiler 202, compiler 204, and compiler 210. These compilers can convert the subset of source code files 230 into object files 212, object files 214, and object files 216. Upon creating an object file, compilation manager 150 sends the object file to linker 220 without waiting for compiler 202, compiler 204, and compiler 210 to finish creating the remaining object files. As linker 220 receives each object file, linker 220 performs the linking process for the object file to facilitate creating executable program 240.

Compiling a Computer Program

Figure 3:
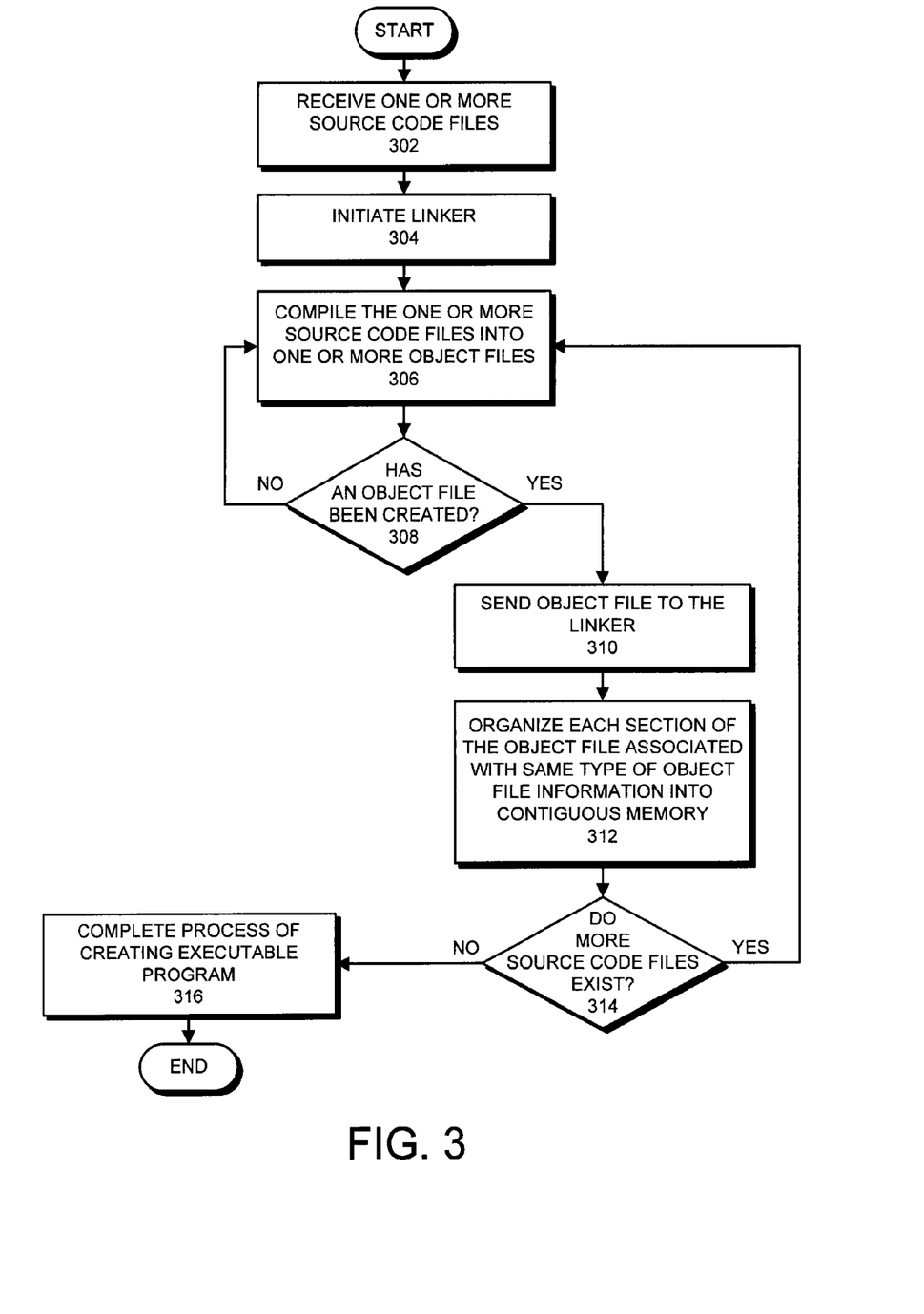
FIG. 3 presents a flowchart illustrating a process for compiling a computer program in accordance with an embodiment of the present invention.

FIG. 3 presents a flowchart illustrating a process for compiling a computer program in accordance with an embodiment of the present invention. The process begins when compilation manager 150 receives from user 112 one or more source code files associated with a computer program (operation 302). Note that user 112 can write these source code files in any type of programming language, such as C, C++, or C#.

In one embodiment of the present invention, compilation manager 150 receives the one or more source code files from client 110, server 130, or server 140.

In one embodiment of the present invention, a compiler, such as compiler 202, receives the one or more source code files.

In one embodiment of the present invention, multiple compilers, such as compiler 202 and compiler 204, can receive the one or more source code files. In this embodiment, each compiler may receive a subset of the one or more source code files.

In one embodiment of the present invention, a different computing system can host each compiler. For example, server 130 can host compiler 202, and server 140 can host compiler 204.

Compilation manager 150 then starts linker 220, which links one or more object files into an executable program, such as executable program 240 (operation 304). Next, compilation manager 150 compiles the one or more source code files into one or more object files (operation 306). Note that compilation manager 150 can use one or more compilers, such as compilers 202 and 204, which can operate in parallel, to perform operation 306.

In one embodiment of the present invention, each object file is comprised of multiple sections. In this embodiment, each section is associated with a different type of object file information. For example, one section can be a .text section, which is associated with executable instructions. In a second example, one section can be a .rodata section, which is associated with read only data.

Compilation manager 150 then determines if one or more of the compilers has created an object file (operation 308). If not, compilation manager 150 continues with operation 306. If so, compilation manager 150 sends the object file to linker 220 without waiting for the other compilers to create the remaining object files from the source code files (operation 310).

In one embodiment of the present invention, compilation manager 150 notifies linker 220 that a compiler has created an object file by sending linker 220 a notification message. Note that the notification message can include an identifier for (or a pointer to) the compiler that created the object file. In this embodiment, linker 220 can then retrieve the object file from the compiler which created the object file.

In one embodiment of the present invention, compilation manager 150 can initiate linker 220 on a distributed computing system. In this embodiment, linker 220 can determine the number and estimated size of the one or more object files based on the source code files before the one or more compilers create the one or more object files. Linker 220 can then map a priori a subset of the one or more object files to multiple computing systems. Each computing system can then complete the linking process for the subset of the one or more object files associated with the computing system.

In one embodiment of the present invention, linker 220 determines the number and estimated size of the one or more object files based on default information.

Upon receiving the object file, linker 220 organizes each section of the object file associated with the same type of object file information into contiguous memory (operation 312).

In one embodiment of the present invention, a section of memory that is associated with a type of object file information stores that type of object file information for all of the object files. For example, a section of memory associated with .rodata stores the .rodata from object files 212, object files 214, and object files 216 in contiguous memory. Note that the .text object file information can be stored in memory space that is not contiguous to the .rodata object file information.

Configuration manager 150 then determines if any more source code files exist which configuration manager 150 has not sent to linker 220 (operation 314). If so, configuration manager 150 returns to operation 306. If not, configuration manager 150 completes the process of creating the executable program (operation 316).

In one embodiment of the present invention, linker 220 associates a different thread with each object file that linker 220 receives. In this embodiment, linker 220 can process multiple object files in parallel.

Alternative Compilation Process

Figure 4:
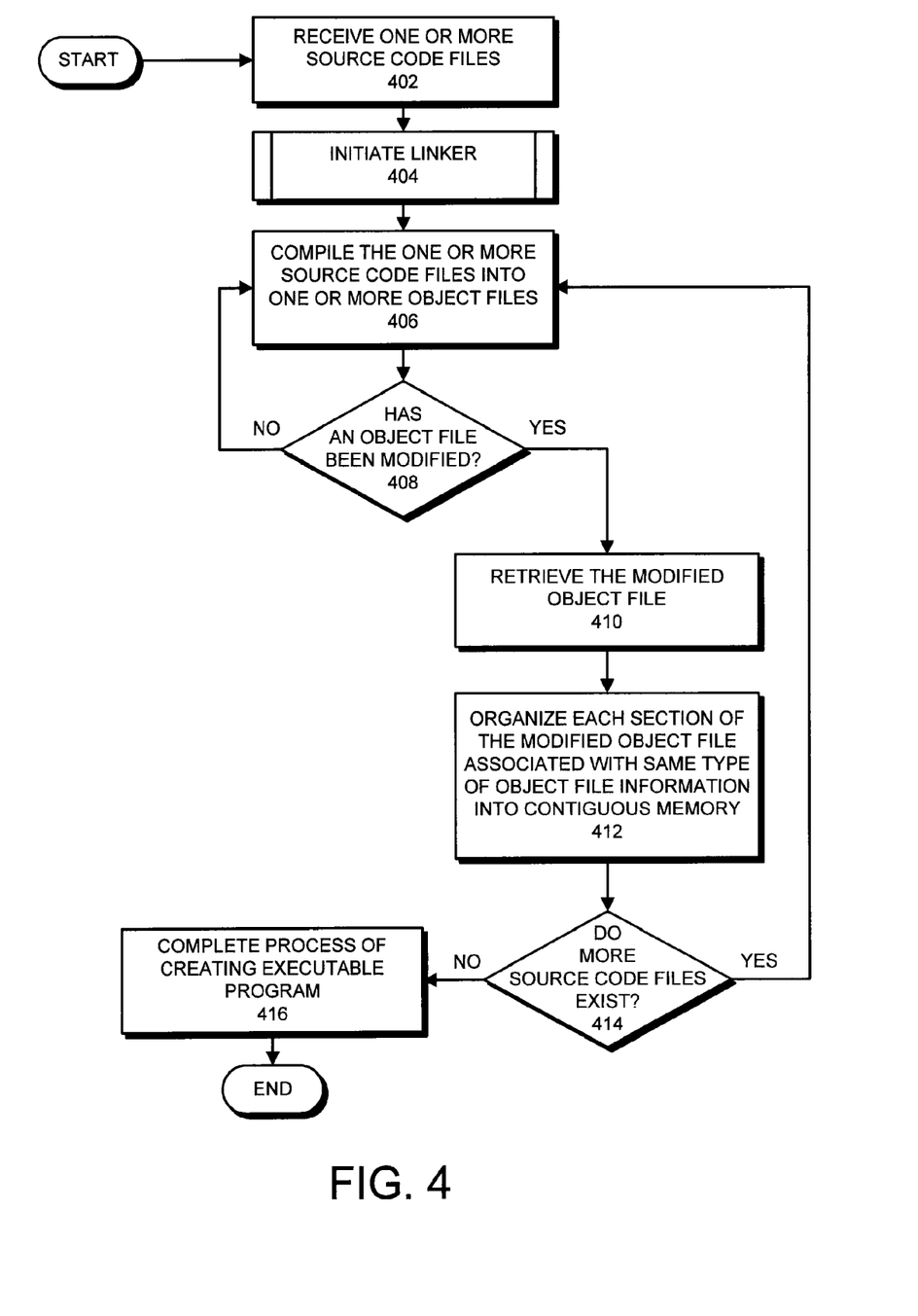
FIG. 4 presents a flowchart illustrating an alternative process for compiling a computer program in accordance with an embodiment of the present invention.

FIG. 4 presents a flowchart illustrating an alternative process for compiling a computer program in accordance with an embodiment of the present invention. The process begins when compilation manager 150 receives from user 112 one or more source code files associated with a computer program (operation 402). Compilation manager 150 then starts linker 220, which links one or more object files into an executable program, such as executable program 240 (operation 404). Note that this is a multi-step operation that is described in more detail with reference to FIG. 5.

Next, compilation manager 150 compiles the one or more source code files into one or more object files (operation 406). Note that compilation manager 150 can use one or more compilers which operate in parallel, such as compilers 202 and 204, to perform operation 406.

Linker 220 then determines if one or more of the compilers has modified an object file (operation 408). If not, compilation manager 150 continues with operation 406. If so, linker 220 retrieves the modified object file from the one or more compilers (operation 410).

Upon retrieving the modified object file, linker 220 organizes each section of the modified object file associated with the same type of object file information into contiguous memory (operation 412). Configuration manager 150 then determines if source code files exist which linker 220 has not yet retrieved from the one or more compilers (operation 414). If so, configuration manager 150 returns to operation 406. If not, configuration manager 150 completes the process of creating the executable program (operation 416).

Starting a Linker

Figure 5:
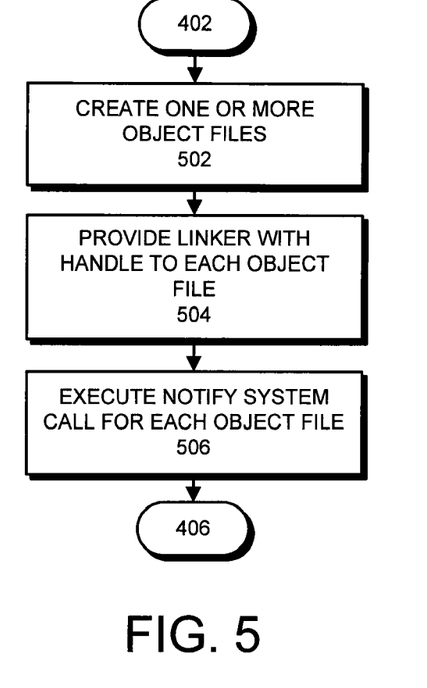
FIG. 5 presents a flowchart illustrating a process for starting a linker in accordance with an embodiment of the present invention.

FIG. 5 presents a flowchart illustrating a process for starting a linker in accordance with an embodiment of the present invention. The process begins when compilation manager 150 creates one or more object files in response to receiving the one or more source code files during operation 402 (operation 502). In this embodiment, the one or more object files are empty files that one or more compilers will populate with content during operation 406.

In one embodiment of the present invention, the one or more object files initially include default data associated with compilation manager 150.

In one embodiment of the present invention, the one or more object files initially include default data associated with the one or more source code files.

Next, compilation manager 150 provides linker 220 with a handle to each object file (operation 504). Linker 220 then executes a notify system call for each object file (operation 506). Note that this notify-system-call enables linker 220 to determine if one or more of the compilers has modified one or more of the object files. Compilation manager 150 then proceeds to operation 406.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   receiving source code files associated with a computer program at one or more compilers;

starting a linker;
compiling the source code files into object files, each of the object files comprising multiple sections, each associated with a different type of object file information;
sending each of the object files to the linker, after compiling at least some of the source code files into object files, and without waiting to compile any remaining source code files;
processing, in the linker, each of the object files as they are received by the linker by:
determining if the one or more compilers modified any of the object files currently in process with the linker;
retrieving any modified object files; and
organizing each section of each of the object files that is associated with the same type of object file information into contiguous memory; and
creating the executable program after all of the object files have been processed by the linker.

2. The method of claim 1, further comprising receiving the source code files at multiple compilers, wherein each compiler is located at a different client, and wherein sending each of the object files to the linker comprises sending subsets of the object files from the compilers to the linker.

3. The method of claim 1, wherein sending each of the object files to the linker comprises:
sending a notification message to the linker after each of the plurality of object files is created; and
retrieving each of the plurality of the object files after receiving the notification message for each of the plurality of object files in the linker.

4. The method of claim 1, wherein processing, in the linker, each of the object files comprises associating a different thread with each of the object files.

5. The method of claim 1, wherein the linker is started on a distributed computing system.

6. A non-transitory computer-readable storage medium storing instructions that when executed by one or more computers cause the one or more computers to perform a method, the method comprising:
receiving source code files associated with a computer program at one or more compilers;
starting a linker;
compiling the source code files into object files, each of the object files comprising multiple sections, each associated with a different type of object file information;
sending each of the object files to the linker, after compiling at least some of the source code files into the object files, and without waiting to compile any remaining source code files;
processing, in the linker, each of the object files as they are received by the linker by:
determining if the one or more compilers modified any of the object files currently in process with the linker;
retrieving any modified object files; and
organizing each section of each of the object files that is associated with the same type of object file information into contiguous memory; and
creating the executable program after all of the plurality of object files have been processed by the linker.

7. The non-transitory computer-readable storage medium of claim 6, wherein the method further comprises receiving the source code files at multiple compilers, wherein each compiler is located at a different client, and wherein each compiler sends a subset of the object files to the linker.

8. The non-transitory computer-readable storage medium of claim 6, wherein sending each of the object files to the linker comprises:
sending a notification message to the linker after each of the plurality of object files is created; and
retrieving each of the plurality of the object files after receiving the notification message for each of the plurality of object files in the linker.

9. The non-transitory computer-readable storage medium of claim 6, wherein processing, in the linker, each of the object files comprises associating a different thread with each of the plurality of object files.

10. The non-transitory computer-readable storage medium of claim 6, wherein the linker is initiated on a distributed computing system.

11. An apparatus that compiles a computer program, comprising:
a receiving mechanism, implemented on a computing system including memory, configured to receive source code files associated with a computer program at one or more compilers;
a compilation mechanism, implemented on a computing system including memory, configured to compile the source code files into object files, each of the object files comprising multiple sections, each associated with a different type of object file information; and
a linking mechanism, implemented on a computing system including memory, configured to:
receive each of the object files;
process each of the object files as they are received and without waiting to receive any remaining object files by:
determining if the one or more compilers modified any of the object files currently in process with the linking mechanism;
retrieving any modified object files; and
organizing each section of each of the object files that is associated with the same type of object file information into contiguous memory; and
create an executable program after all of the plurality of object files are processed.

12. The apparatus of claim 11, wherein the linking mechanism is further configured to receive the source code files from multiple compilers, wherein each compiler is located at a different client, and wherein each compiler sends a subset of the object files to the linking mechanism.

13. The apparatus of claim 11, further comprising a sending mechanism, wherein the sending mechanism is further configured to send a notification message to the linking mechanism which enables the linking mechanism to retrieve each of the object files from the compiler.

14. The apparatus of claim 11, wherein the compilation mechanism is further configured to provide the linking mechanism with a handle to each of the plurality of object files, which enables the linking mechanism to use a notification system call to detect modifications to each of the plurality of object files.

15. The apparatus of claim 14, further comprising a detection mechanism configured to detect a modification to a particular object file, and wherein the linking mechanism is configured to retrieve the particular object file from the compiler in response to the detection mechanism detecting the modification to the particular object file.

16. The apparatus of claim 11, wherein the linking mechanism is further configured to associate a different thread with each object file.

17. The apparatus of claim 11, wherein the starting mechanism is further configured to initiate the linking mechanism on a distributed computing system.

18. The method of claim 1, further comprising:
providing handles for associating with respective object files to the linker, and wherein determining the modified object files comprises determining whether any of the object files have been modified using the associated handle for each of the object files and a notification system call.

* * * * *